Figure 1:
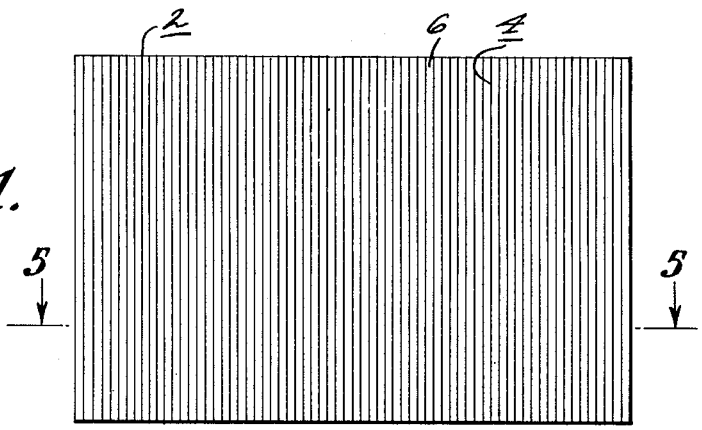

Dec. 13, 1955  I. G. MALOFF  2,726,573
REAR PROJECTION VIEWING SCREEN
Filed Aug. 30, 1950

INVENTOR
Ioury G. Maloff
BY
ATTORNEY

United States Patent Office 2,726,573
Patented Dec. 13, 1955

2,726,573

REAR PROJECTION VIEWING SCREEN

Ioury G. Maloff, Camden, N. J., assignor to Radio Corporation of America, a corporation of Delaware Application August 30, 1950, Serial No. 182,332

5 Claims. (Cl. 88—28.93)

This invention relates to improvements in rear projection viewing screens. More particularly, it relates to improvements in translucent screens for optical projection systems which include wide-angle lenses.

Screens of the present invention may be used in any optical system in which an image is projected onto one side of a screen and viewed from the opposite side. However, the invention has particular application in television projection systems employing the well known Schmidt optical system or an equivalent system for greatly enlarging the image formed on a kinescope having a face of relatively small diameter. Magnification is, of course, attended by a corresponding decrease in brightness of the image. As a consequence, in order to provide a sufficiently bright picture, it is necessary to direct toward the viewer as much as possible of the light normally diffused to the sides and above and below the normal viewing zone. The screen of the present invention is of this directional type.

Screens of the directional type have previously been proposed. Some of these have been characterized by having curved faces which result in a rather heavy and cumbersome structure. The screen of the present invention has substantially plane faces. Previous screens of this general type are described in United States Patent 2,510,344, issued June 6, 1950, to R. R. Law, and also in co-pending application, Serial No. 747,620, filed May 13, 1947, now Patent No. 2,529,701, by Ioury G. Maloff. These screens have proven satisfactory in commercial projection television sets because of their generally high brightness factor. They may have a "light gain" of between 7 and 7½. By "light gain" is meant the ratio of brightness of the screen to the illumination of the screen. In English units, it becomes the ratio of brightness of the screen in foot-lamberts to incident illumination in lumens per square foot. Unless otherwise specified, the brightness is assumed to be measured in a direction normal to the screen.

Screens of the type above described, even though commercially satisfactory, have certain disadvantages. They have a circular Fresnel or "lighthouse" lens pattern embossed on one face and vertical ribs embossed on the other. These contrasting geometrical patterns cause an annoying moiré effect to be visible to the viewer unless a considerable amount of a light diffusing medium is included in the screen between the two faces. The light diffusing material, or opacifier, absorbs some of the light that should be directed to the viewer. It will be apparent that a more efficient screen would result if the opacifier could be omitted.

Another disadvantage of the screens above referred to is that they are composed of three different sheets of material laminated together by heat and pressure. The laminae include a thin sheet containing a light-diffusing composition between two outer faces of clear plastic. Handling and assembling operations add to the manufacturing cost and molding is made difficult by trapping of air bubbles. Separations also sometimes occur upon aging, especially with extreme changes of temperature and humidity.

The viewing screen of the present invention is similar to previously devised screens such as described above in that it comprises a light-transmitting member of substantially uniform thickness throughout and has lens patterns embossed on its front and rear surfaces which cooperate to give a directional effect. In contrast with previous screens, however, the present screen has, instead of a circular Fresnel lens on its rear surface, a Fresnel lens composed of horizontal elements. The front surface, instead of having vertical ribs consisting of simple cylindrical lenses, has a second Fresnel lens which is composed of vertical elements upon each of which a cylindrical lens pattern is superimposed.

One object of the present invention is to provide an improved rear projection viewing screen permitting increased brightness of the image directed thereon.

Another object of the invention is to provide an improved rear projection screen of the directional type.

Another object of the invention is to provide an improved rear projection screen of the directional type which is of relatively simple construction.

Another object of the invention is to provide a directional viewing screen completely free of moiré effects.

Another object of the invention is to provide an improved rear projection viewing screen of the directional type which is relatively economical to manufacture.

Still another object of the invention is to provide a rear projection screen having relatively high "light gain" and which is resistant to temperature and humidity changes.

Figure 2:
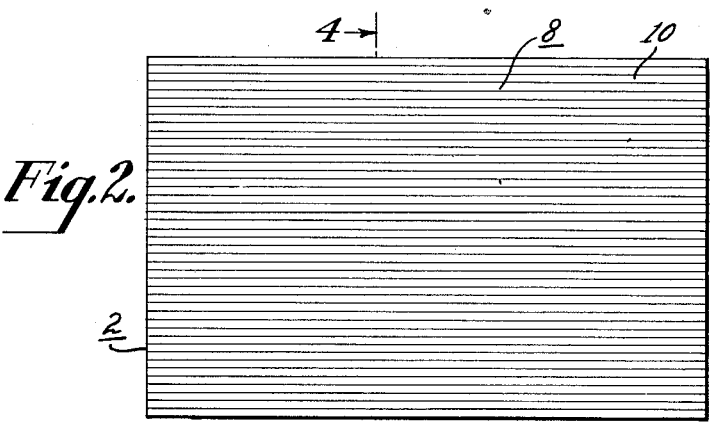
Figure 3:
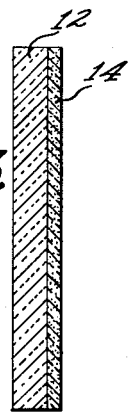
Figure 4:
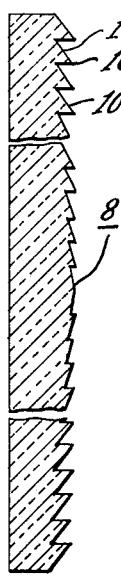
Figure 5:
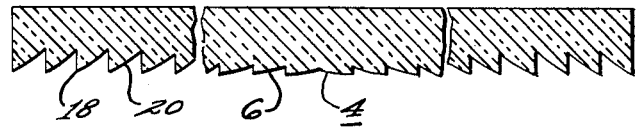

These and other objects will be more apparent and the invention will be more readily understood by reference to the following specification and to the accompanying drawing wherein:

Figure 1 is a front elevation of a viewing screen in accordance with the present invention, Figure 2 is a rear elevation of the screen of Figure 1, Figure 3 is a sectional view of a screen made in accordance with one embodiment of the invention and in an intermediate stage of construction, Figure 4 is an enlarged view of a partial section taken along the line 4—4 of Figure 2, and Figure 5 is an enlarged view of a partial section along the line 5—5 of Figure 1.

Referring to the different figures of the drawing, wherein the same parts have been designated with like numerals, a preferred embodiment of a viewing screen in accordance with the invention will now be described.

A suitable material for making a screen in accordance with the present invention is a substantially flat, transparent sheet 2 of polymethyl methacrylate synthetic resin having a thickness of about $\frac{1}{16}$ inch. The front surface 4 of this sheet is provided with a Fresnel lens consisting of vertical elements 6. Although the number of elements in a given width is not particularly critical, it is preferred to use about 100 per inch. If the number of elements per inch is too low, the pattern will become too coarse and will be objectionably noticeable to the viewer. On the other hand, if the number of elements per inch is increased to too high a figure, say 200 per inch, interference colors will appear. Consequently, the number of elements should be sufficiently high to permit adequate picture resolution and should be below that at which interference colors appear. A generally acceptable range is from about 75 to 150 per inch. A preferred form of an individual element will be more particularly described later.

The back surface 8 of the screen is also provided with a Fresnel lens pattern but the elements 10 are caused to run in a horizontal direction; that is, at right angles to the elements of the front surface lens.

The two Fresnel lens patterns as above described may be placed on either face of a single sheet of the synthetic resin or a laminated construction may be employed as illustrated in Figure 3. Where the number of elements per inch is about 100 or more and when the lenses are substantially uniform and otherwise perfect in detail, no diffusing medium is required. Since it is difficult to attain perfection in molding an article of this type, it is necessary sometimes to use a diffusing medium in order to mask slight imperfections. When this is necessary, the screen may be made by laminating together a thin sheet 12 of the clear plastic and a diffusing sheet 14 which is preferably plasticized and stabilized polyvinyl chloride about 0.01 inch thick containing about 5% of finely divided silica. The diffusing sheet may be of the same type as that more particularly described in applicant's co-pending application, Serial No. 747,620, filed May 13, 1947, but the necessary percentage of silica is considerably less.

When a laminated construction, such as above described, is used, the side of the clear plastic to which the diffusing sheet is laminated becomes the rear of the screen and has formed in its surface a Fresnel lens with horizontal elements as shown in Figure 2. Lamination is accomplished by placing the two sheets together and pressing with application of some heat. The pressing may be done in the same step during which the lens elements are embossed on the body.

Instead of using a separate sheet with diffusing medium dispersed therein, the screen may comprise a single sheet of plastic having diffusing medium already incorporated therein. Silica may be dispersed throughout the polymethyl methacrylate during the manufacturing process. The percentage of diffusing medium used will depend upon the type of imperfection which it is desired to mask.

Referring now to Figure 4, the individual elements 10 which make up the rear surface Fresnel lens will now be more particularly described. Each element consists of a step having a riser 16 inclined at an acute angle to the overall plane surface of the lens. Each riser has a front surface 17 which is plane. The angle of inclination of the risers gradually decreases from the edges toward the center. The maximum angle at the edges depends upon the vertical angle of spreading desired for the light rays emerging from the front. Usually, in a television projection system, it is desired to have a viewing angle of not more than about ±10° in the vertical direction. To satisfy this condition, the maximum angle of inclination of the risers should be about 34°.

Figure 5 shows the configuration of the elements which constitute the Fresnel lens on the front of the screen. Here, also, the risers 18 are given a gradually decreasing angle of inclination to the overall plane surface of the sheet but the risers instead of having a plane surface each have the configuration of a surface of a cylindrical lens. Thus, a cylindrical lens pattern is superimposed on the Fresnel pattern. The cylindrical lens surfaces 20 are preferably given a radius of curvature of about 0.01 inch and the maximum angle of inclination of the risers is about 34°. This provides a horizontal useful viewing angle of about 18° from either side of a normal to the viewing surface. The useful viewing angle of a screen is defined as that angle at which screen brightness drops to 50% of the brightness apparent to a viewer whose line of sight is perpendicular to the center of the screen. In general, the radius of curvature of the cylindrical elements may be from about 0.008" to 0.012".

Screens of the preferred type which have been described, and which have no diffusing medium incorporated therewith, have a light gain of between 8 and 9.

Viewing screens, such as have been described above, may be made by an embossing process. A matrix or die is made by inscribing in a metal surface a negative of the lens pattern which is to be embossed into the surface of the plastic sheet. Metals suitable for this surface are aluminum alloys, brass, or steel. The dies for both surfaces of the article are then seated in opposing platens of a press, a sheet of the synthetic resin is placed over the lower die and the platens are closed with application of high pressure. The platens are preferably heated to facilitate the embossing process. When the pressure is released and the platens opened, the finished article may be lifted out, ready for use.

I claim as my invention:

1. A projection screen comprising a light transmitting member of substantially uniform overall thickness throughout, and having a rear surface with a Fresnel lens formed therein, said Fresnel lens consisting of multiplicity of substantially horizontal stepped grooves, the risers of which have plane front surfaces which are of progressively decreasing slope toward the center of said surface, and face away from the center of said surface and also including a front surface having formed therein a Fresnel lens consisting of a multiplicity of vertical stepped grooves, the risers of which are of progressively decreasing slope toward the center of said surface and face toward the center of said surface, each of said risers of said vertical grooves having superimposed thereon a convex cylindrical lens configuration.

2. A screen according to claim 1 in which the number of said grooves is about 100 per inch.

3. A screen according to claim 1 in which the maximum riser angle is about 34°.

4. A screen according to claim 1 in which the radius of curvature of said cylindrical lenses is about 0.01 inch.

5. A screen according to claim 1 in which the radius of curvature of all of said cylindrical lenses is a value between about 0.008 inch to about 0.012 inch.

References Cited in the file of this patent

UNITED STATES PATENTS

| | | |
|---|---|---|
| 1,970,358 | Bull et al. | Aug. 14, 1934 |
| 2,082,100 | Dorey et al. | June 1, 1937 |
| 2,207,835 | Sukumlyn | July 16, 1940 |
| 2,326,042 | Lessman | Aug. 3, 1943 |
| 2,529,701 | Maloff | Nov. 14, 1950 |
| 2,588,373 | Erban | Mar. 11, 1952 |